United States Patent
Choi

(10) Patent No.: US 9,669,475 B2
(45) Date of Patent: Jun. 6, 2017

(54) CHAMFERING MACHINE FOR PROVIDING OPTIMAL OPERATION CONDITION DURING OPERATION OF CUTTING SURFACE OF CIRCULAR MATERIAL AND SURFACE CUTTING METHOD

(71) Applicant: DCSENG CO., LTD., Daejeon (KR)

(72) Inventor: Insung Choi, Daejeon (KR)

(73) Assignee: DCSENG CO., LTD., Daejeon (KR)

( * ) Notice: Subject to any disclaimer, the term of this patent is extended or adjusted under 35 U.S.C. 154(b) by 11 days.

(21) Appl. No.: 14/397,262

(22) PCT Filed: Nov. 7, 2013

(86) PCT No.: PCT/KR2013/010058
§ 371 (c)(1),
(2) Date: Oct. 27, 2014

(87) PCT Pub. No.: WO2014/081143
PCT Pub. Date: May 30, 2014

(65) Prior Publication Data
US 2015/0258613 A1    Sep. 17, 2015

(30) Foreign Application Priority Data

Nov. 21, 2012   (KR) .......................... 10-2012-0132667

(51) Int. Cl.
*B23C 3/12*        (2006.01)
*B23C 1/20*        (2006.01)

(52) U.S. Cl.
CPC .............. *B23C 3/122* (2013.01); *B23C 1/20* (2013.01); *B23C 2220/16* (2013.01); *Y10T 82/10* (2015.01);
(Continued)

(58) Field of Classification Search
CPC ....... B23C 3/122; B23C 3/12; B23C 2220/16; B23C 1/20; Y10T 409/30644; Y10T 409/304144
See application file for complete search history.

(56) References Cited

U.S. PATENT DOCUMENTS 3,553,904 A  *  1/1971  Wallace .................. B23B 5/168
                                                      409/175
3,699,828 A  *  10/1972  Piatek ........................ B23B 5/16
                                                      144/205
(Continued)

FOREIGN PATENT DOCUMENTS

CN        202239827        5/2012
GB        2234697 A  *  2/1991   ............... B23B 5/16
(Continued)

OTHER PUBLICATIONS

Chinese Office Action—Chinese Application No. 201380023156.5 issued on Apr. 19, 2016, citing CN 202239827, U.S. Pat. No. 4,625,464 and U.S. Pat. No. 8,297,157.
(Continued)

*Primary Examiner* — Sunil K Singh
*Assistant Examiner* — Ryan Rufo
(74) *Attorney, Agent, or Firm* — Cantor Colburn LLP

(57) ABSTRACT

Disclosed is a chamfering machine which enables a smooth cutting operation by allowing a workpiece to be fixed to a position corresponding to an optimal cutting condition. The chamfering machine comprises a cutting position groove, which is formed in the bottom surface of an upper guide, and into which a part of the outer circumferential surface of a workpiece is inserted, wherein the central part of the cutting position groove is formed to correspond to the cutting end of a chamfering cutter. The machining method is configured such that the chamfering cutter enters perpendicular to a centerline direction of a circular material and, after entering (Continued)

while cutting, to a point where the cutting end of a cutting tip is in line with the centerline, rotates a tubular material or revolves the chamfering cutter around the tubular material and thus can cut the surface of the circular material.

6 Claims, 7 Drawing Sheets

(52) U.S. Cl.
CPC ........ *Y10T 82/22* (2015.01); *Y10T 409/30644* (2015.01); *Y10T 409/303752* (2015.01)

(56) References Cited

U.S. PATENT DOCUMENTS

| | | | | |
|---|---|---|---|---|
| 4,180,358 A * | 12/1979 | Uribe | ........................ | B23B 5/16 409/179 |
| 4,625,464 A | 12/1986 | Kubo | | |
| 4,768,903 A * | 9/1988 | Merritt, Jr. | ........... | B23Q 9/0028 142/32 |
| 5,038,525 A * | 8/1991 | Gardner | .................. | B24B 9/007 15/104.03 |
| 6,146,067 A * | 11/2000 | Owens | .................... | B23B 5/168 30/122 |
| 6,698,321 B2 * | 3/2004 | Oswald | ................... | B23B 5/168 82/113 |
| 8,297,157 B1 | 10/2012 | Miller et al. | | |
| 2004/0206218 A1 * | 10/2004 | Nybo | ..................... | B23B 5/168 82/113 |
| 2008/0014035 A1 | 1/2008 | Perkovich et al. | | |
| 2012/0057945 A1 | 3/2012 | Jeon et al. | | |
| 2012/0067190 A1 * | 3/2012 | Tseng | ..................... | B23C 3/122 83/869 |

FOREIGN PATENT DOCUMENTS

| | | | | |
|---|---|---|---|---|
| JP | 01097814 | | 6/1989 | |
| JP | 2002-052402 A | * | 2/2002 | .............. B23B 5/16 |
| KR | 1020050012867 | | 2/2005 | |
| KR | 200386898 | | 6/2005 | |

OTHER PUBLICATIONS

European Search Report—European Application No. 13857244.1 issued on Jul. 30, 2015, citing US 2012/057945.
International Search Report—PCT/KR2013/010058 dated Feb. 18, 2014.

* cited by examiner (a)            (b)

CHAMFERING MACHINE FOR PROVIDING OPTIMAL OPERATION CONDITION DURING OPERATION OF CUTTING SURFACE OF CIRCULAR MATERIAL AND SURFACE CUTTING METHOD

TECHNICAL FIELD

The present disclosure relates to a chamfering machine, and more particularly, to a chamfering machine and a method of cutting a surface of a circular material, which can provide a cutting position satisfying the optimal condition between a tubular material and a cutter, thereby maximally preventing defective machining due to a defect of the tubular material itself.

BACKGROUND ART

Usually, a tubular material or a bar material is subject to a chamfering work for chamfering a cut surface thereof by a chamfering machine so that it can be used in an industrial field or at home. The chamfering work is necessary not only for securing the safety by removing a sharp cut surface but also for forming a bead surface for welding.

Further, the chamfering machine is also used in a surface cutting work for cutting an outer peripheral surface, as well as the chamfering work.

As shown in FIG. 1, a chamfering machine, which we usually use, includes a chamfering machine body 11 having an electric motor attached thereto, a chamfering cutter 12 which is connected to the electric motor and cuts a workpiece by using a rotational force provided by the electric motor, an adjustment lever 13 installed on an upper part of the chamfering machine body 11 to adjust the elevating height of the chamfering cutter 12, and a guide 20 installed at a part under the chamfering cutter 12 in a state in which the guide is bent by 90 degrees in order to enable a more convenient chamfering work. Further, the guide 20 has a structure which can be rotated about the chamfering cutter 12 for shifting between works, such as chamfering and surface cutting.

Therefore, as shown in FIG. 2, by properly rotating the guide 20 according to the work, it is possible to perform various works, such as chamfering (a) and surface cutting (b) of a flat plate, and chamfering (c) and surface cutting (d) of a tubular material or bar material.

In this event, although the other works make no problem, the surface cutting (d) of a tubular material or bar material requires a high level of technical skill. That is, as shown in FIG. 3, for surface cutting of a tubular material (p), the chamfering cutter 12 first approaches the tubular material (p) from the outside thereof as shown in (a), and the surface of the tubular material (p) starts to be cut as soon as the chamfering cutter 12 comes into contact with the tubular material (p) as shown in (b). Further, as the chamfering cutter 12 enters more deeply as shown in (c), the thickness by which the tubular material (p) is cut increases.

Further, the surface cutting starts when the chamfering cutter 12 enters while cutting out the outer peripheral surface of the circular material (p) as shown in FIG. 4, and the thickness of the surface cutting gradually decreases from the moment when the chamfering cutter 12 goes over the center of the upper surface of the circular material (p). Further, at the point where the central part of the chamfering cutter 12 and the upper surface of the circular material are aligned with each other, the upper surface of the circular material is not in contact with the cutting tip 12a of the chamfering cutter 12 any longer and thus idly rotates without being cut.

This is because the chamfering cutter 12 has a cylindrical shape and has the cutting tip 12a attached to the circumferential surface thereof. Therefore, the cutting work is not performed any longer after the cutting surface reaches the central portion of the chamfering cutter.

In a vertical chamfering machine wherein the principal axis of the chamfering cutter and the axial center of the circular material perpendicularly meet each other, as shown in FIG. 4, the thickness of the surface cutting changes according to the portion in contact with the lower end of the chamfering cutter regardless of how constant the height of the chamfering cutter relative to the guide is. Of course, as noted from the third figure, the cutting work may not be achieved at all.

For a more detailed description, referring to FIG. 5 which shows in more detail than FIG. 4, as noted from the lower front view, at the moment when the chamfering cutter comes into contact with one side of the circular material, the outer surface of the circular material is cut out as much as indicated by the thin solid line by the portion in contact with the cutting end of the cutting tip. In other words, as noted from the upper plan view, the surface the circular material in contact with a part of the outer periphery of the chamfering cutter is a cut surface, and the hatched portion lengthily extending on the outer peripheral surface of the circular material from the cut surface is a surface to be cut with a predetermined cutting width.

In this state, if the chamfering cutter proceeds further in the proceeding direction, the cutting width increases and the cutting depth (d) also increases. That is, the cutting depth is determined according to how much the chamfering cutter is pushed into the cut surface by the worker's hand. Therefore, it is impossible to precisely set the cutting depth according to optional selection based on the naked eye and the force applied by the hands.

Moreover, as noted from FIG. 6, in the cutting work when the cutting tip of the chamfering cutter has passed over the central line of the circular material, the portion of the circular material in contact with the cutting tip is cut as noted from the part hatched by the right uphill lines while the central portion of the circular material which is not in contact with the cutting tip is not cut as noted from the part hatched by the right downhill lines. The situation as shown in FIG. 6 corresponds to a situation when the cutting tip and the circular material come into contact with each other for the first time. However, when the circular material has rotated more or the chamfering cutter has progressed more, further cutting is not performed, which may cause a load to a non-cutting section between the circular material and the chamfering cutter or may make the chamfering machine bounce.

In order to solve the problem as described above, as shown in FIG. 7, another technique employs a guide 20b, which extends downward and has moving guide rolls 22 installed thereon, wherein, after selection of the cutting position of the chamfering cutter 12, the guide rolls 22 are fixed to and in tight contact with the outer peripheral surface of the tubular material (p) so that they can be used as an auxiliary means for the chamfering work.

However, although the guide rolls 22 as described above may be an improvement in the working method, they are not enough to deal with an unavoidable defect of the tubular material (p). That is, as noted from FIG. 8, when the tubular material (p) has an ellipsoidal shape, the guide rolls 22 sliding on the tubular material (p) while being in tight contact with both sides thereof may change the cutting position of the chamfering cutter 12 while moving upward or downward according to the curvature of the tubular material.

The tubular material (p) may be not only ellipsoidal but also uneven. In fact, when the tubular material (p) is ellipsoidal or uneven, there are considerably many more defects than expected. However, there is a tendency in the field using the tubular material that the defects in the chamfering work are given short shrift since the defects are thought as a problem of the raw material itself, which is a tubular material.

DISCLOSURE

Technical Problem

The present disclosure has been made in order to solve the above-mentioned problems, and is to provide a chamfering machine and a surface cutting method for a circular material, which enable a smooth cutting operation by allowing a workpiece to be fixed to a position corresponding to an optimal cutting condition during the operation of cutting the surface of a tubular material or bar material and which can also maximally prevent defective machining due to a primitive defect of a workpiece.

Technical Solution

In order to solve the above problems, the present disclosure provides a chamfering machine, which includes a chamfering machine body having a chamfering cutter which is disposed perpendicularly to a central axis of a circular material, a workpiece to be processed, and chamfers or cuts a surface of the circular material by an outer periphery of the lower end thereof, and an upper guide coupled to a lower part of the chamfering machine body, wherein a cutting position groove in which a part of the outer peripheral surface of the circular material is inserted is formed on the lower surface of the upper guide, and the central portion of the cutting position groove is aligned with a cutting end of a cutting tip formed at the edge of the chamfering cutter.

The cutting position groove may have rounded opposite ends or a triangular sectional shape.

Further, the upper guide may have a lower guide perpendicularly connected to the upper guide, the lower guide may have downwardly curved semicircular guide holes, and a pair of guide rolls may be coupled with the guide holes in such a manner that the guide rolls can be selectively held by the guide holes.

Further, the upper and lower guides may rotate about the chamfering cutter.

Also, the present disclosure provides a method for chamfering or cutting a surface of a circular material by a chamfering machine, the chamfering machine including a chamfering cutter, an upper guide, and a cutting position groove, the chamfering cutter having a cutting tip which is mounted on an outer periphery of a lower surface thereof, is disposed perpendicularly thereto, and rotates, the upper guide being coupled to a part adjacent to the chamfering cutter to guide an outside of a workpiece, the cutting position groove being formed on a lower surface of the upper guide and aligned with an extension line of the cutting end of the cutting tip, the method including arranging the central axis of the circular material to be perpendicular to the axial direction of the chamfering cutter, entering the chamfering cutter perpendicularly to a direction of a central line of the circular material, cutting the circular material up to a point where the cutting end of the cutting tip is aligned with the central line, and rotating the circular material or revolving the chamfering machine around the circular material while holding a state in which an outside of the center line of the circular material is inserted in the cutting position groove to prevent the chamfering cutter from entering in the circular material any further.

Advantageous Effects

As described above, in a chamfering machine according to the present disclosure, a cutting position groove is formed to enable a cutting end of a chamfering cutter and a center line of a workpiece to cross each other at a right angle. Therefore, the chamfering machine according to the present disclosure can improve the cutting efficiency and enables a surface cutting at a uniform thickness.

The cutting position groove according to the present disclosure can overcome even a primitive defect of a workpiece during the surface cutting of a tubular material or bar material, thereby enabling processing with a desired uniform thickness.

BRIEF DESCRIPTION OF THE DRAWINGS

The foregoing and other objects, features and advantages of the present disclosure will become more apparent from the following detailed description when taken in conjunction with the accompanying drawings in which.

BEST MODE

Mode for Invention

Hereinafter, a chamfering machine for providing an optimal work condition according to an exemplary embodiment of the present disclosure will be described with reference to the accompanying drawings.

Figure 1:
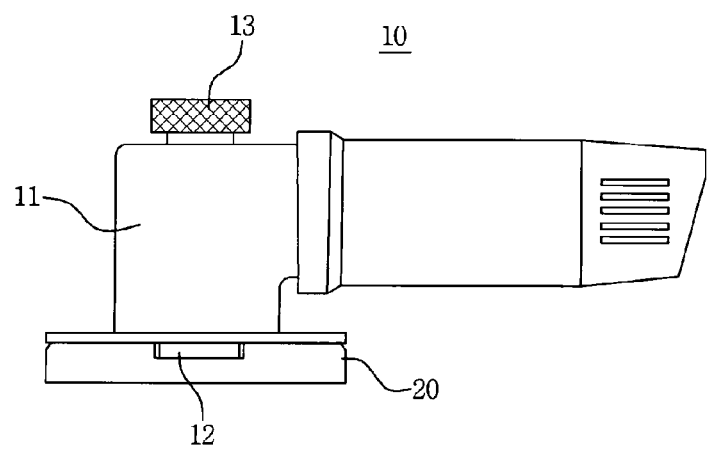
FIG. 1 illustrates a generally used chamfering machine.
Figure 2:
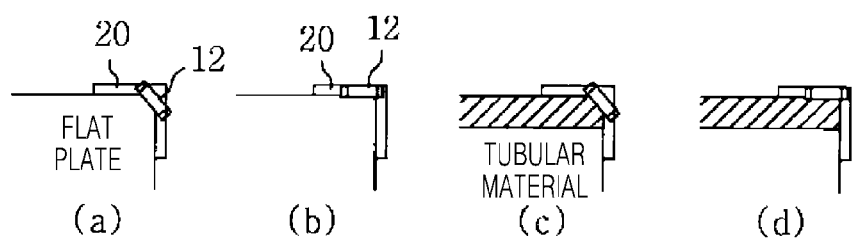
FIG. 2 illustrates views showing works which can be performed using the chamfering machine shown in FIG. 1.
Figure 3:
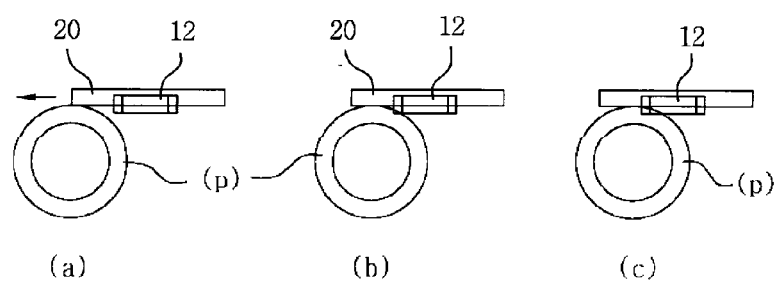
FIG. 3 illustrates views showing a process of cutting a surface of a tubular material or bar material.
Figure 4:
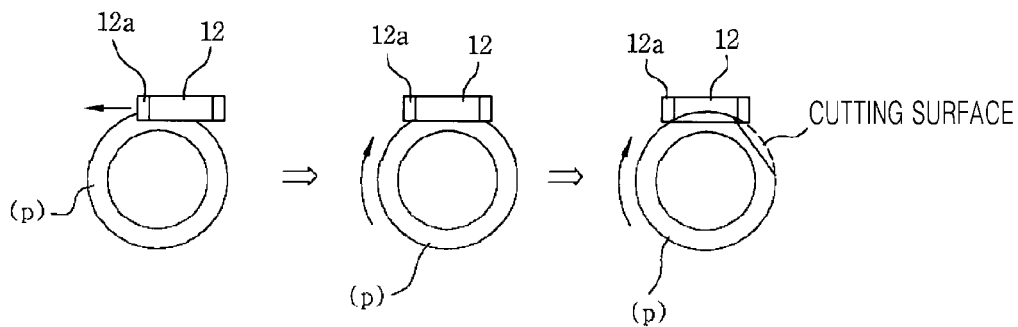
FIG. 4 illustrates views for showing a problem in the process of cutting a surface of a tubular material or bar material.
Figure 5:
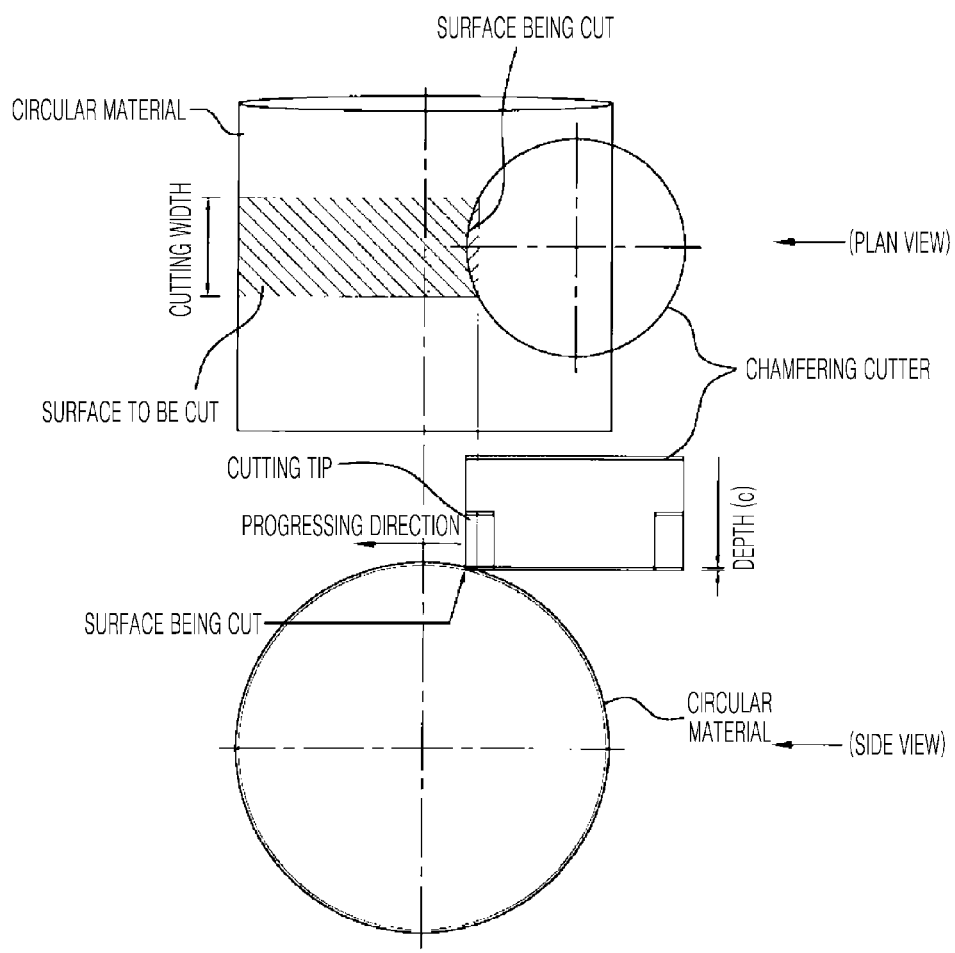
FIG. 5 is a view for showing the problem presented in FIG. 4 in more detail.
Figure 6:
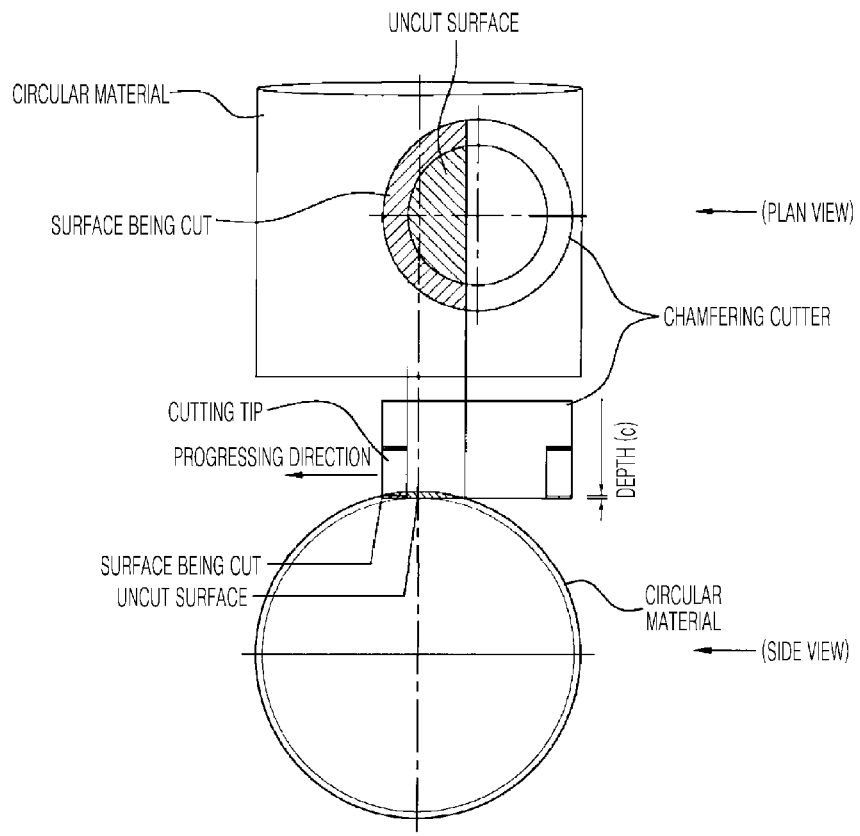
FIG. 6 is a view showing a state in which the face cutting work has been progressed more than FIG. 5.
Figure 7:
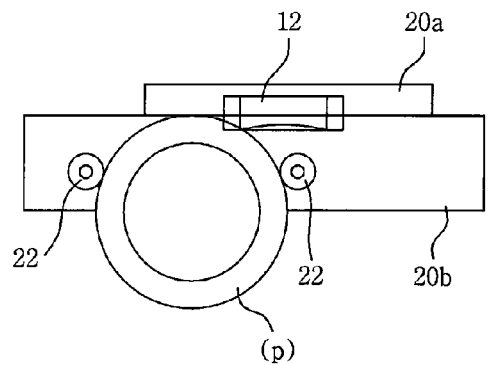
FIG. 7 is a view showing a chamfering machine arranged in order to solve the problem shown in FIGS. 4 to 6.
Figure 8:
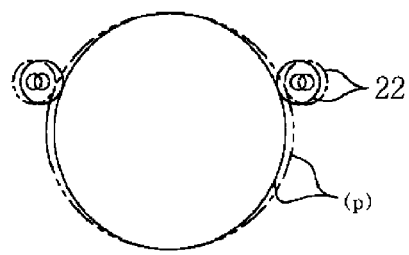
FIG. 8 is a view showing a problem which cannot be solved by even the chamfering machine shown in FIG. 7.
Figure 9:
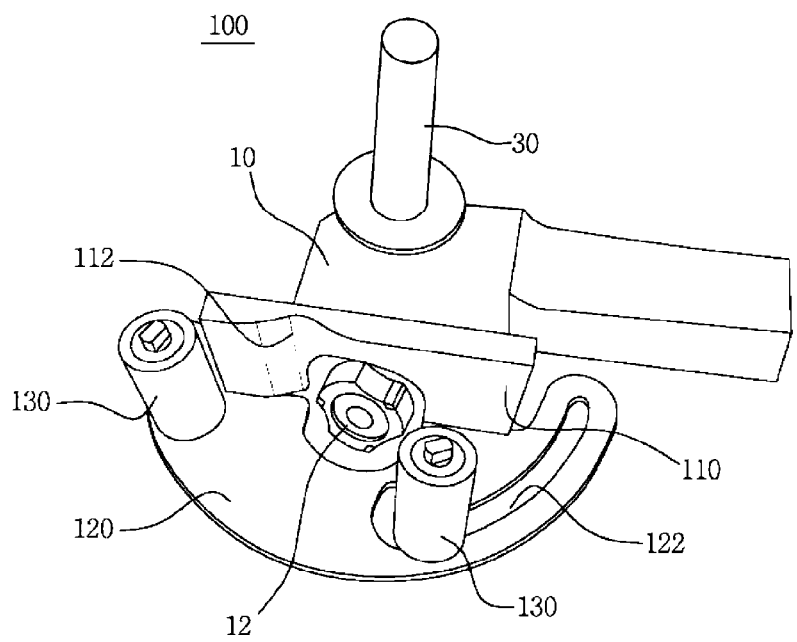
FIG. 9 is a perspective view showing a chamfering machine according to the present disclosure.

Referring to FIG. 9, as described in the background, a chamfering machine 100 according to the present disclosure includes a chamfering machine body 10, a chamfering cutter 12 which is installed to the chamfering machine body 10 and rotates at a high speed, and guides 110 and 120 which are coupled to a lower part of the chamfering machine body 10 and have a shape of the letter "L". Further, in consideration that the chamfering work is a manual work performed by applying force to the machine, an auxiliary grip 30 attached to the chamfering machine body 10 may be further used.

The chamfering machine 100 according to the present disclosure is characterized in that it can present an optimum cutting position at which a circular material is to be cut by the chamfering cutter 12 and can provide an optimum work condition for the apparatus.

The guides include an upper guide 110 extending in parallel to the chamfering cutter 12 and a lower guide 120 extending perpendicularly to the chamfering cutter 12. The upper guide 110 has a cutting position groove 112 formed thereon and the lower guide 120 has guide rolls 130 moving along an arcuate route.

First, the cutting position groove 112 is a concave portion formed on the lower surface of the upper guide 110. When a circular material, such as a tubular material or a bar material, is processed, the circular material is tightly seated in the cutting position groove 112 so that the circular material is held to a certain degree.

Figure 10:
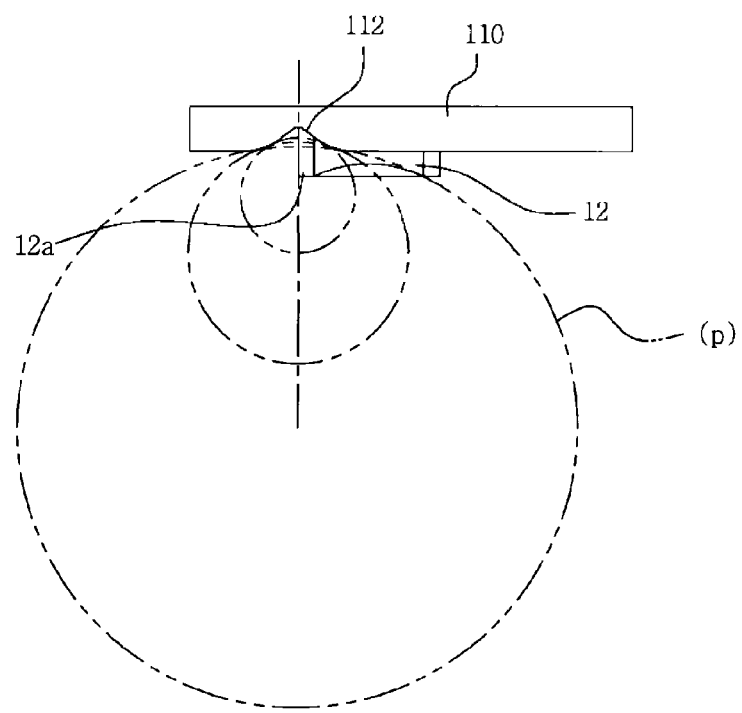
FIG. 10 is a view taken from the upper side of an upper guide in order to describe the function of the chamfering machine according to the present disclosure.

As shown in FIG. 10, the cutting position groove 112 is formed such that the central portion of the cutting position groove 112 is aligned with the distal end of the cutting tip of the chamfering cutter 12. The reason why the cutting position groove 112 is formed at the above position is in order to make the highest end of a circular material (p), such as tubular material or bar material, be aligned with the center of the cutting position groove 112, that is, to make the highest end of the circular material be aligned with the distal end of the cutting tip of the cutting position groove 112 when the circular material has been tightly seated in the cutting position groove 112.

Every processing has the best efficiency and the best processing quality when a processing machine enters a workpiece in parallel to the workpiece and a cutter perpendicularly meets the workpiece. However, there has been no effort to find such a cutting position and only entry of a cutting tip with a desired thickness has been considered in the conventional chamfer machine or chamfering method.

That is, in the prior arts, a worker roughly aligns the chamfering cutter 12 and the cut portion of the circular material (p) while viewing positions of them by his or her naked eye and uses a guide roll in order to hold the positions. As a result, it is impossible to achieve a precise surface cutting of a circular material by the conventional methods, and the conventional chamfering has been mostly used in chamfering or surface cutting of a flat surface or only chamfering of a circular material.

Figure 11:
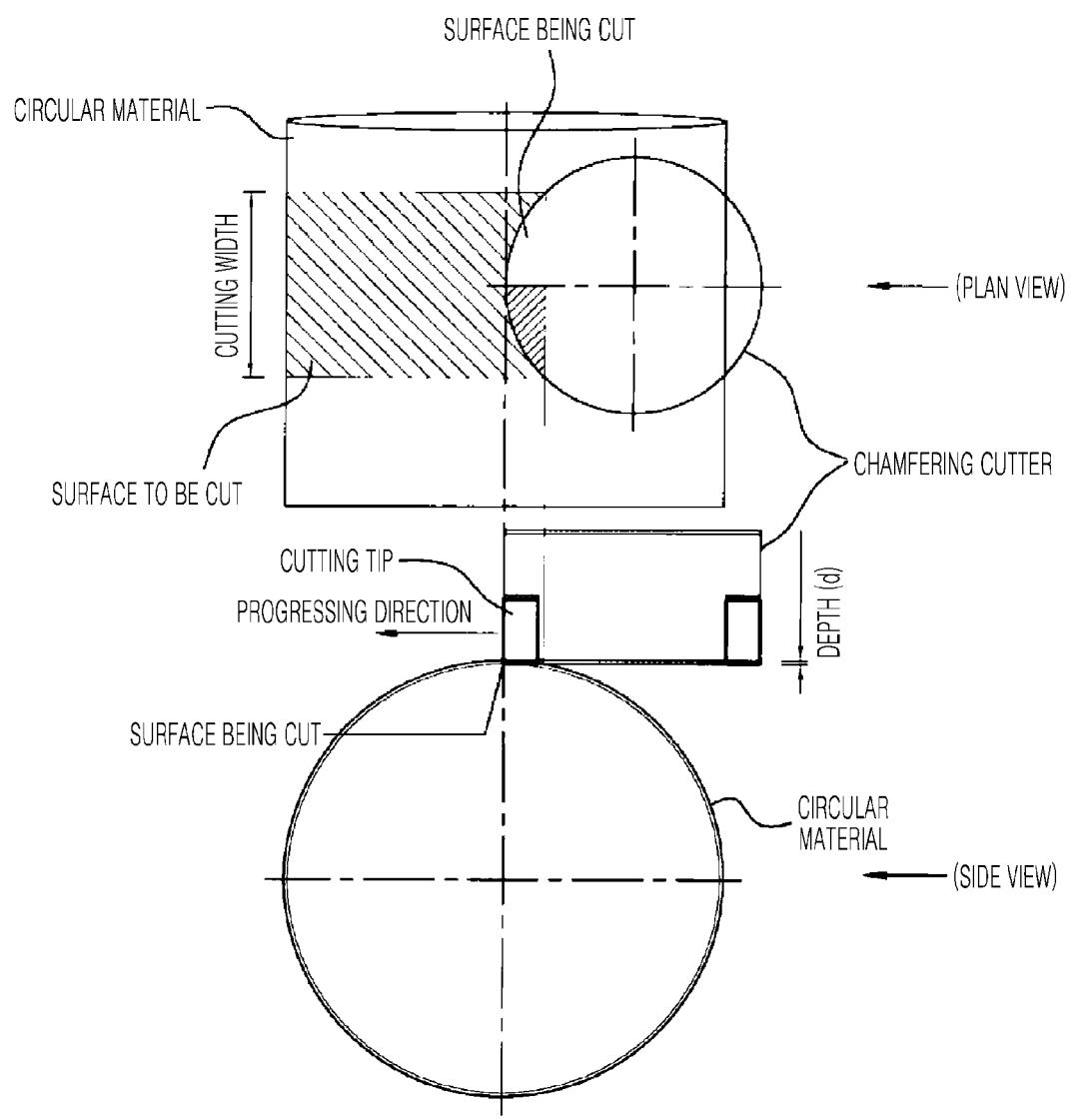
FIG. 11 is a view showing an optimum operation state of a chamfering machine according to the present disclosure.

However, if the processing can be performed in the state where the cutting end of the cutting tip is aligned with the central line of the circular material, the processing can achieve a minimum cutting depth (d) and a maximum cutting width, can prevent the occurrence of error in the cutting depth, and can improve the cutting quality. That is, although it is most ideal that a cutting tip for cutting a surface of a circular material makes a right angle to a surface to be cut at the center of the circular material as shown in FIG. 11, it is impossible by only the naked eye and sense of touch to exactly align them at the right angle.

Therefore, the present disclosure provides a chamfering machine configured such that the chamfering cutter and the circular material meet perpendicularly to each other, the chamfering machine having a cutting position groove formed on an upper guide therein, by which a cutting work can be performed in a state where the cutting end of the cutting tip 12*a* is aligned with the center of the circular material (p), i.e. in an optimum condition. As described above, it is most desirable that the cutting position groove 112 is formed to make the cutting end of the cutting tip 12*a* be exactly aligned with the center of the circular material (p). However, it is unavoidable to consider errors therein. That is, although it is best to select a position as exactly as possible, it is possible to expect an error of several mm with a slight difference according to the diameters of pipes.

As described above, in the present disclosure, the cutting position is fixedly arranged on the upper surface of the upper guide 110. Therefore, all tubular materials are partially caught by the cutting position groove 112 so that it is held to a certain degree. Of course, a tubular material or bar material having a small diameter has a larger area in contact with the groove and is thus subject to a larger holding force, while a tubular material or bar material having a large diameter has a smaller area in contact with the groove and is thus subject to a smaller holding force. However, even partial catching can generate a considerably large holding force by a force pressing downward.

Figure 12:
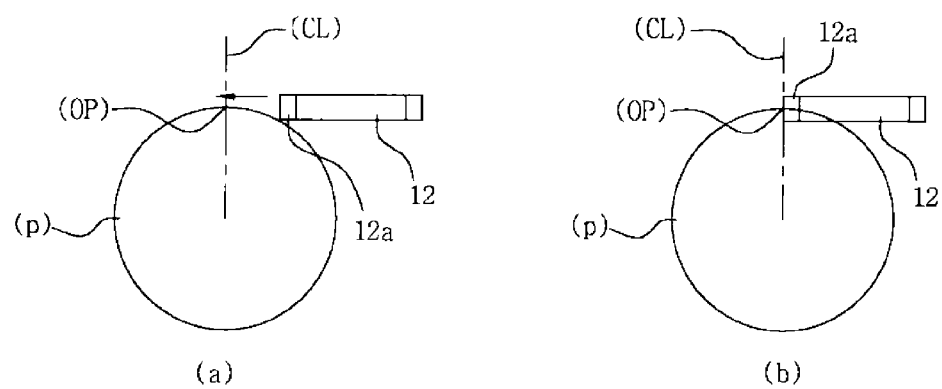
FIG. 12 illustrates views showing an example of a method of cutting a surface of a circular material according to the present disclosure.

In a method for cutting a surface of a circular material according to the present disclosure, as shown in (a) of FIG. 12, when a point OP is set on the outer peripheral surface of a circular material (p) and a line extending through the point OP from the center of the circular material (p) is put as a center line CL, the chamfering cutter 12 enters the circular material from the outside thereof in a state where the chamfering cutter is lowered by a cutting thickness from the point OP, the cutting end of the cutting tip 12*a* enters only up to the point where it meets the center line CL as shown in (b) of FIG. 12, and the surface cutting is performed at that position by the rotation of the circular material (p) itself or the revolution of the chamfering cutter 12 around the circular material.

The cutting position groove 112 according to the present disclosure not only provides the cutting position as described above but also reduces the influence of primitive defects, which may exist in a circular material, such as a tubular material or bar material, thereby enabling a high quality processing.

That is, in the processing according to the prior arts, which depends on only the guide rolls, the position at which the chamfering cutter 12 performs the cutting is considerably spaced apart from the positions at which the guide rolls are in contact with the material. Therefore, the chamfering cutter 12 may move up or down according to the positions and states (curvature, unevenness, etc.) of the guide rolls regardless of the cutting position, thereby making it impossible to achieve a cutting with a uniform thickness.

In contrast, in the chamfering machine 100 according to the present disclosure, since the cutting position groove 112 provides a basic reference for the cutting position, the cutting position groove 112 and the chamfering cutter 12 located directly thereunder move in the same manner according to the curvature or unevenness of the circular material, such as tubular material or bar material, and thus make it possible to achieve a surface cutting with a uniform thickness.

It is enough if the cutting position groove 112 has a width capable of receiving a small part of the upper surface of a circular material. Further, if the opposite ends of the cutting position groove 112 are rounded, it is possible to prevent the occurrence of a scratch on a workpiece and reduce the friction with the workpiece. Also, it is desirable that the cutting position groove 112 has a triangular sectional shape so that it can be adapted to workpieces having various diameters.

The lower guide 120 according to the present disclosure has a downwardly curved semicircular shape and the guide rolls 130 installed on the lower guide 120 are configured to move along an arcuate route, so that they can be sufficiently adapted to a large size change in circular materials to be processed. Therefore, the lower guide 120 has an arcuate guide hole 122 in which each of the guide rolls 130 can move and may have a coupling means (not shown), which is formed at the rear side of the guide roll 130 to selectively fix or release the guide roll to or from the guide hole 122.

In the chamfering machine 100 according to the present disclosure, the cutting position groove 112 serves as a first cutting position providing means and the guide rolls 130 serve as auxiliary means. Therefore, the guide rolls 130 are not indispensable elements in some configurations.

Although not shown in detail in the attached drawings, it goes without saying that the chamfering machine 100 according to the present disclosure may also have a structure which enables the guides 110 and 120 to pivot about the chamfering cutter 12 for the chamfering.

Although exemplary embodiments of the present disclosure have been described as shown above, it will be understood that various modifications and variations can be made by those skilled in the art to which the present disclosure pertains without departing from the spirit and scope of the present disclosure described in the below claims.

The invention claimed is:

1. A chamfering machine comprising:
    a chamfering machine body;
    a rotating chamfering cutter disposed in the chamfering machine body, the rotating chamfering cutter including a cutting tip disposed at an outer circumferential surface of the rotating chamfering cutter;
    an upper guide disposed in the chamfering machine body, the upper guide having a surface perpendicular to a rotating axis of the rotating chamfering cutter; and
    a cutting position groove concaved from the surface of the upper guide, the cutting position groove extending perpendicular to the rotating axis of the rotating chamfering cutter,
    wherein the cutting position groove is configured to receive a circular material along a central portion of the cutting position groove in parallel with a central axis of the circular material, and
    wherein the axis of the rotating chamfering cutter is disposed at one side of the central portion of the cutting position groove, and, when the rotating chamfering cutter rotates, the cutting tip of the rotating chamfering cutter is configured to be aligned with the central portion and simultaneously not to pass through the other side of the central portion of the cutting position groove.

2. The chamfering machine of claim 1, wherein the cutting position groove has rounded opposite ends.

3. The chamfering machine of claim 1, wherein the cutting position groove has a triangular sectional shape.

4. The chamfering machine of claim 3, further comprising: a lower guide perpendicularly connected to the upper guide, wherein the lower guide has curved semicircular guide holes, and a pair of guide rolls are coupled with the guide holes in such a manner that the guide rolls can be selectively held by the guide holes.

5. The chamfering machine of claim 2, wherein the cutting position groove has a triangular sectional shape.

6. The chamfering machine of claim 5, further comprising: a lower guide perpendicularly connected to the upper guide, wherein the lower guide has curved semicircular guide holes, and a pair of guide rolls are coupled with the guide holes in such a manner that the guide rolls can be selectively held by the guide holes.

* * * * *